H. C. STEPHENS.
Seeding-Machines.
No. 141,472. Patented August 5, 1873.
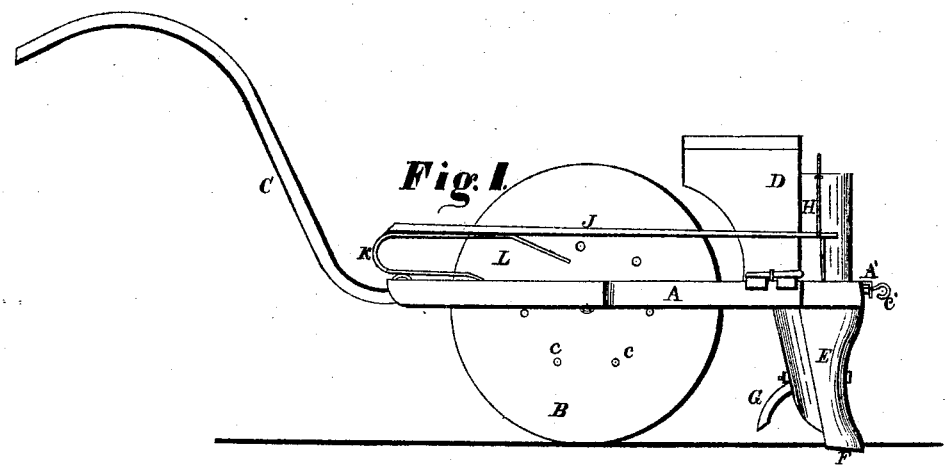
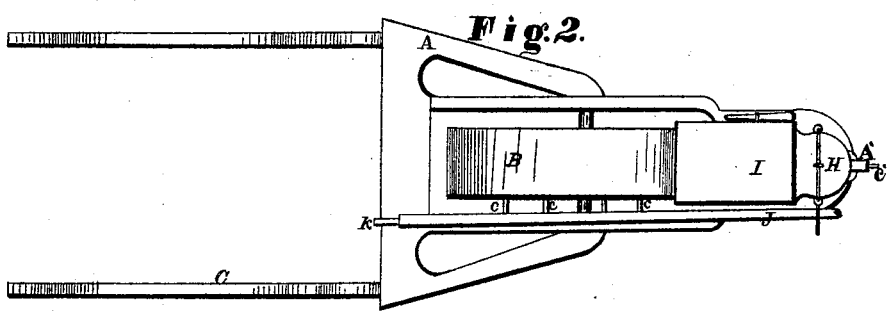
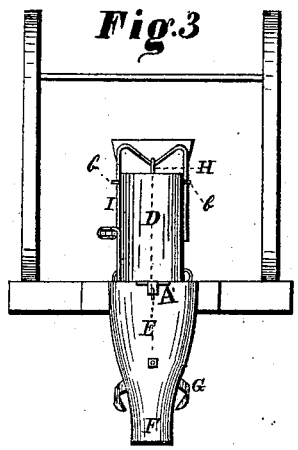 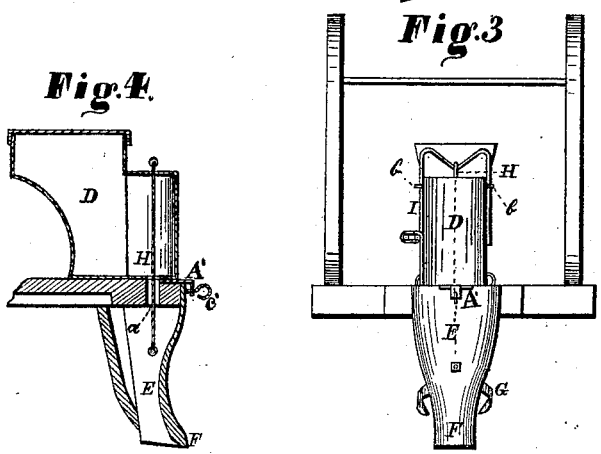 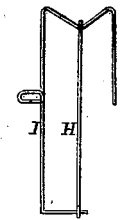
Witnesses.
A. F. Cornell.
Thomas Smith.
Inventor.
H. C. Stephens.
Per. Burridge & Co.
Attys.

UNITED STATES PATENT OFFICE.

HENRY CHARLES STEPHENS, OF GLENVILLE, OHIO.

IMPROVEMENT IN SEEDING-MACHINES.

Specification forming part of Letters Patent No. 141,472, dated August 5, 1873; application filed June 9, 1873.

*To all whom it may concern:*

Be it known that I, HENRY C. STEPHENS, of Glenville, in the county of Cuyahoga and State of Ohio, have invented a certain new and Improved Seeding-Machine; and I do hereby declare that the following is a full, clear, and complete description thereof, reference being had to the accompanying drawings making part of the same.

Figure 1 is a side elevation of the machine. Fig. 2 is a plan view. Fig. 3 is a front elevation. Fig. 4 is a vertical longitudinal detached section. Fig. 5 is a detached section.

Like letters of reference refer to like parts in the several views.

This invention is for sowing small seeds; and the details thereof consist of a hopper for holding the seeds, a plow for making the drill, and a scraper for covering the seed therein. It also consists of an agitator for clearing the seed-opening in the hopper and certain devices for operating the same, all of which is hereinafter more fully described.

The frame A, Fig. 2, of this machine is mounted upon the wheel or roller B. To the frame are attached the handles C, and on the front end thereof is secured the seed hopper or box D. Immediately below the front of the seed-box is a hollow standard, E, having communication with the seed-box by means of a small passage, a, Fig. 4. The point F of the standard is of convex form for furrowing the ground to receive the seed, which, when dropped therein, is covered by the scraper G. The agitator referred to consists of a cord, H, Figs. 4 and 5, secured to a frame, I. Said frame is fitted to the outside of the seed-box, as shown in Fig. 3, and secured in such position by staples b, through which it passes and freely slides. The lower part of one side of the frame passes into the standard-spout, as shown in Fig. 4, and to which the lower end of the cord H is fastened, as shown in Fig. 5. The position of the frame in relation to the seed-box is such as to allow the cord to pass directly through the passage a referred to, as shown in Fig. 4. A reciprocating movement is given to the agitator by an arm, J, one end of which is attached to the frame I, whereas the opposite end is secured to the frame A by the intervention of a spring, K, Fig. 1. Said arm is actuated for operating the agitator by the pins c projecting from the side of the roller, which as it revolves lifts said arm by impinging on the finger L projecting from its lower side, which, when the pin leaves the finger, the spring K brings down the arm to the position shown in Fig. 1.

This machine is propelled forward by hand, the wheel running upon the ground and the share F into the ground, turning a shallow furrow, into which the seed from the hopper falls, and is then covered by the scraper G and slightly rolled down by the wheel B passing over it. The seed is prevented from lodging in the passage a, and is made to flow from the seed-box in a constant and uniform manner by the agitator, which, by its vertical reciprocating action, obtained by the means described, draws the cord reciprocally through said passage, thereby preventing the seed from crowding and lodging about it. Hence the sowing of the seed is constant and uniform in quantity. The amount of seed allowed to pass from the seed-box is regulated by a slide, A', Fig. 4, whereby the opening a may be closed by pushing in said slide by means of the screw c'.

What I claim as my invention, and desire to secure by Letters Patent, is—

1. The combination of the frame A, roller B, seed-box D, hollow standard E, point or share F, and scraper G, in the manner as and for the purpose set forth.

2. The agitator, consisting of the frame I and cord H, in combination with the seed-box D, arm J, spring K, and pins c of the roller B, substantially in the manner as and for the purpose specified.

HENRY CHARLES STEPHENS.

Witnesses:
JOHN H. BURRIDGE,
A. F. CORNELL.